United States Patent Office 3,809,678
Patented May 7, 1974

3,809,678
POLYLAURYLLACTAM WITH IMPROVED RESISTANCE TO THE EFFECTS OF HEAT, OXYGEN AND LIGHT
Wolfgang Kriesten, Marl, and Heinz Scholten, Oberhausen, Germany, assignors to Chemische Werke Huls Aktiengesellschaft, Marl, Germany
No Drawing. Continuation of abandoned application Ser. No. 14,624, Feb. 26, 1970. This application Oct. 19, 1971, Ser. No. 190,635
Claims priority, application Germany, Apr. 15, 1959, P 19 19 021.7
Int. Cl. C08f 45/58; C08g 51/58
U.S. Cl. 260—45.85 R    6 Claims

ABSTRACT OF THE DISCLOSURE

Polylauryllactam having improved resistance to the effects of heat, oxygen and light, prepared by conducting the polymerization in the presence of:

(a) 0.4–1.5 percent by weight of a carboxylic acid of the general formula

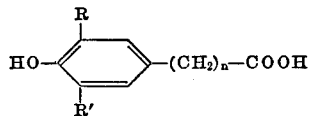

wherein
$n$ is an integer of from 0 to 4, and
R and R' are alkyl groups of 1–5 carbon atoms, and
(b) 0.05–0.3 percent by weight of phosphoric acid and/or phosphorous acid—in each case based on the monomeric lauryllactam.

CROSS REFERENCE TO A RELATED APPLICATION

Applicants claim priority under 35 U.S.C. 119 for application P 19 19 021.7, filed Apr. 15, 1969 in the Patent Office of the Federal Republic of Germany.

This is a continuation of application Ser. No. 14,624, filed Feb. 26, 1970, now abandoned.

BACKGROUND OF THE INVENTION

The field of the invention is aminocarboxylic acid reaction products and the present invention is particularly concerned with polylauryllactam having improved resistance to the effects of heat, oxygen and light.

The state of the prior art for preparing and stabilizing polylauryllactam may be ascertained by reference to the Kirk-Othmer "Encyclopedia of Chemical Technology," 2nd ed., vol. 16 (1968), under the section "Polyamides (Plastics)," pages 88–105, particularly pages 92 and 93 wherein the polymerization of lauryllactam to nylon-12 is given and the use of plasticizers and heat and light stabilizers is disclosed.

It is known that polyamides tend to decrease in quality when exposed to the effects of heat and air and particularly, the mechanical properties are impaired. This effect becomes particularly apparent in that the molded articles become brittle. Therefore, a variety of different stabilizers have been added to polyamide molding compositions as disclosed in the "Kunststoff-Handbuch," vol. VI, Polyamide (1966), pp. 445 et seq., and p. 240. Examples of these stabilizers are compounds containing aromatic hydroxy groups, such as, for example, pyrocatechol and hydroquinone (U.S. Pat. 2,598,163), esters of p-hydroxybenzoic acid (U.S. Pat. 2,597,163 of Michaels & Machlis, issued May 20, 1952), and 2,6-di-tert.-butyl-4-alkylphenol (German published application 1,052,679 of Björn Olsen et al., published Mar. 12, 1959). The disadvantage of these compounds resides in that:

(1) They must be added to the finished polyamide in a special process—the so-called finishing; and
(2) They are readily removed from the polyamide because they are soluble in alcohols or water, whereby the desired stabilizing effect is lost.

It is also conventional to add to the monomeric lactam selected stabilizers which do not react during the polymerization. Thus, it is known from U.S. Pat. 3,174,944 of Jürgen Brandes, patented Mar. 23, 1965, to conduct the polycondensation in the presence of iodobenzoic acid. From the prior art, it is known that carboxylic acids, such as adipic acid, acetic acid, stearic acid and also the above-mentioned iodobenzoic acid, are employed as activators during the hydrolytic polymerization of lactams—optionally together with phosphoric acid or other oxygen acids of phosphorus. When these compounds are employed as catalysts no definite stabilizing effect can be observed. One skilled in the art would therefore arrive at the conclusion that those stabilizers are particularly effective which diffuse into the polymer, at the point where the effect occurs, i.e. the stabilizers are suitably added to the polyamide and not to the monomeric lactam.

SUMMARY OF THE INVENTION

It has now been discovered that it is possible to obtain polylauryllactam exhibiting an improved resistance to the effects of heat, oxygen and light by conducting the polymerization in the presence of:

(a) 0.4–1.5 percent by weight of a carboxylic acid of the general formula

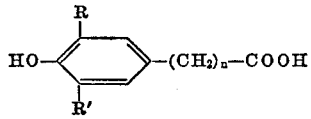

wherein
$n$ is an integer of from 0 to 4, and
R and R' are alkyl groups of 1–5 carbon atoms, and
(b) 0.05–0.3 percent by weight of phosphoric acid and/or phosphorous acid—in each case based on the monomeric lauryllactam.

Especially advantageous is a mixture of 0.8–1.2 percent by weight of component (a) and
0.1–0.2 percent by weight of component (b).

In particular, β-(4 - hydroxy-3,5-di-tert.-butylphenyl)-propionic acid is employed as component (a) and phosphorous acid as component (b).

As the substance (a), it is also possible to employ such a derivative of the acid which, under the reaction conditions, forms the acid and a component readily volatile with steam, which component does not alter the quality of the polymer. An example in this connection are the methyl esters of the General Formula a.

Especially advantageous is the substance (a) in which R is a branched alkyl with 3–5 carbon atoms.

DESCRIPTION OF THE PREFERRED EMBODIMENTS

The hydrolytic polymerization of the lauryllactam is conducted in a conventional manner at temperatures of between 220 and 320° C. under elevated pressure, for example under the internal pressure of the monomer, under an oxygen-enriched atmosphere in a single or multiple-stage mode of operation. The process is suitably conducted in the presence of 0.5–10 percent by weight of water.

The polymerization is generally carried out in the absence of additional activators, but it is also possible to conduct the reaction in the additional presence of activators, such as, for example, acetic acid or adipic acid. In case further activators are additionally employed, they are used in amounts of up to 0.3 percent by weight, based on the monomer.

The polylauryllactam obtained in accordance with the invention exhibits, besides the advantage of improved thermal stability, also the advantage of making a one-step operation possible. Due to its resistance to lipophilic solvents, the polylauryllactam obtained is employed for hoses and containers which come into contact, for example, with gasoline, as well as for sterilizable packages for foodstuffs and drugs.

The stabilizer incorporated therein by condensation is non-volatile under all processing conditions when the polyamide is shaped in the melt.

Accordingly, contrary to the prior art, no discomfort is incurred by vapors in the metal coating and film draw-down. The corresponding protective measures of the prior art are not necessary in the processing of the plastic.

Examples of the overall combination of lauryllactam, general formula (a) and phosphoric acid/phosphorous acid, include, in percent by weight based upon the lauryllactam:

Lauryllactam, 0.8 β-(4-hydroxy-3,5-di-tert.-butylphenyl)-propionic acid and 0.05 phosphorous acid; lauryllactam, 1.0 β-(4-hydroxy-3,5-di-tert.-butylphenyl)-propionic acid and 0.2 phosphoric acid; lauryllactam, 1.0 β-(4-hydroxy-3,5-di-tert.-butylphenyl)-propionic acid and 0.2 phosphoric acid plus 0.1 phosphorous acid; lauryllactam, 0.8 β-(4-hydroxy-3,5-di-isopropylphenyl)-propionic acid and 0.05 phosphorous acid; lauryllactam, 1.0 β-(4-hydroxy-3,5-di-isopropylphenyl)-propionic acid and 0.2 phosphoric acid; lauryllactam, 0.8 β-(4-hydroxy-3,5-di-tert.-butylphenyl)-butyric acid and 0.05 phosphorous acid; lauryllactam, 1.0 -β-(4-hydroxy-3,5-di-tert.-butylphenyl)-butyric acid and 0.2 phosphoric acid; lauryllactam, 1.0 β-(4-hydroxy-3,5-di-isopropylphenyl)-propionic acid and 0.2 phosphoric acid plus 0.1 phosphorous acid; lauryllactam, 1.0 β-(4-hydroxy-3,5-di-tert.-butylphenyl)-butyric acid and 0.2 phosphoric acid plus 0.1 phosphorous acid; lauryllactam, 0.8 β-(4-hydroxy-3,5-di-isopropylphenyl)-butyric acid and 0.2 phosphoric acid; lauryllactam, 1.0 β-(4-hydroxy-3,5-di-isopropylphenyl)-butyric acid and 0.2 phosphoric acid; lauryllactam, 1.0 β-(4-hydroxy-3,5-di-isopropylphenyl)-butyric acid and 0.2 phosphoric acid plus 0.1 phosphorous acid.

The following examples and the table demonstrate that the improved properties are obtained solely in the polymerization of lauryllactam, and that improved results are achieved when particular proportions of reactants are used.

EXAMPLE 1

Lauryllactam is hydrolytically polymerized at 280° C. with the addition of 0.8 percent by weight of β-(4-hydroxy-3,5-di-tert.-butylphenyl)-propionic acid and 0.06 percent by weight of phosphorous acid ($H_3PO_3$). The relative viscosity of the polyamide at 25° C., measured in a 0.5 percent cresol solution, is 1.70; the proportion which can be extracted with methanol is 1.17 percent. By using the methylester of said β-(4-hydroxy-3,5-di-tert.-butylphenyl)-propionic acid instead of the acid, there is practically no difference in the relative viscosity and in the amount, which can be extracted with methanol.

EXAMPLE 2

Lauryllactam is hydrolytically polymerized with the addition of 1 percent by weight of β-(4-hydroxy-3,5-di-tert.-butylphenyl)-propionic acid and 0.2 percent by weight of phosphoric acid ($H_3PO_4$). The relative viscosity of the polymer at 25° C. is 1.68; the amount which can be extracted with methanol is 1.06 percent. By using the methylester of said β-(4-hydroxy-3,5-di-tert.-butylphenyl)-propionic acid instead of the acid, there is practically no difference in the relative viscosity and in the amount, which can be extracted with methanol.

EXAMPLE 3

Lauryllactam is hydrolytically polymerized with the addition of 1 percent by weight of β-(4-hydroxy-3,5-di-tert.-butylphenyl)-propionic acid, 0.2 percent by weight of phosphoric acid ($H_3PO_4$) and 0.1 percent by weight of phosphorous acid ($H_3PO_3$). The relative viscosity of the polymer at 25° C. is 1.66; the amount which can be extracted with methanol is 1.34 percent. By using the methylester of said β-(4-hydroxy-3,5-di-tert.-butylphenyl)-propionic acid instead of the acid, there is practically no difference in the relative viscosity and in the amount, which can be extracted with methanol.

COMPARATIVE EXAMPLE 1

Lauryllactam is hydrolytically polymerized with the addition of 0.8 percent β-(4-hydroxy-3,5-di-tert.-butylphenyl)-propionic acid. The relative viscosity of the polyamide is 1.46; the proportion which can be extracted with methanol is 1.68 percent.

COMPARATIVE EXAMPLE 2

ε-Caprolactam is hydrolytically polymerized with the addition of 1 percent β-(4-hydroxy-3,5-di-tert.-butylphenyl)-propionic acid and 0.2 percent of phosphoric acid ($H_3PO_4$). The relative viscosity of the polyamide is 1.60; the amount which can be extracted with methanol is 10.3 percent.

COMPARATIVE EXAMPLE 3

For comparison purposes, polylauryllactam is mixed with 1 percent by weight of the ethylhexyl ester of β-(4-hydroxy-3,5-di-tert.-butylphenyl)-propionic acid.

COMPARATIVE EXAMPLE 4

Lauryllactam is hydrolytically polymerized with the addition of 1.6 percent by weight β-(4-hydroxy-3,5-di-tert.-butylphenyl)-propionic acid and 0.2 percent by weight of phosphoric acid ($H_3PO_4$). The relative viscosity of the polymer at 25° C. is 1.54.

For testing purposes, strips having the dimensions of 0.5 x 10 x 50 mm. were produced by pressing from the polylauryllactam obtained in accordance with Examples 1–3 and Comparative Examples 1–4. These strips were heated in the presence of air to 160° C. The time was measured after which the strips ruptured in a bending test. The results are compiled in the following table. In order to determine the resistance to alcohols, the polyamide strips are extracted 15 hours with methanol and then subjected to the above-described temperature treatment. The results are likewise set fourth in the table below.

TABLE

|  | | β-(4-hydroxy-3,5-di-tert.-butylphenyl)-propionic acid | Phosphorous acid | Phosphoric acid | Esters of β-(4-hydroxy-3,5-di-tert.-butylphenyl)-propionic acid | Hours Without alcohol treatment | Hours With alcohol treatment |
|---|---|---|---|---|---|---|---|
| Example: | | | | | | | |
| 1 | Lauryllactam | 0.8 | 0.06 | | | 192 | 132 |
| 2 | do | 1.0 | | 0.2 | | 192 | 132 |
| 3 | do | 1.0 | 0.10 | 0.2 | | 192 | 132 |
| Comp. example: | | | | | | | |
| 1 | do | 0.8 | | | | 20 | |
| 2 | Caprolactam | 1.0 | | 0.2 | | 6 | |
| 3 | Lauryllactam | | | | 1.0 | 120 | 2 |
| 4 | do | 1.6 | | 0.2 | | 96 | 48 |

We claim:
1. A composition of improved heat, oxygen and light stability comprising polylauryllactam to which has been added, prior to polymerization, based on the weight of monomeric lauryllactam, the following components:
(a) about 0.4–1.5 percent by weight of a compound of the general formula:

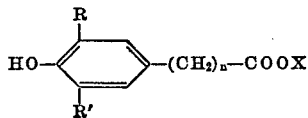

wherein
X is H or a methyl group,
n is an integer of 0–4, and
R and R' are alkyl groups having 1–5 carbon atoms; and
(b) about 0.05–0.3 percent by weight of an acid selected from the group consisting of phosphoric acid, phosphorous acid and mixture thereof.
2. The composition of claim 1, wherein the amount of component (a) is about 0.8 to 1.2 percent by weight and the amount of (b) is about 0.1 to 0.2 percent by weight.
3. The composition of claim 1, wherein R and R' are branched alkyl groups with 3–5 carbon atoms.
4. The composition of claim 1, wherein $n$ is 2, R and R' are alkyl groups with 4 carbon atoms and X is hydrogen.
5. The composition of claim 1, wherein $n$ is 2, R and R' are alkyl groups with 4 carbon atoms and X is a methyl group.
6. The composition of claim 1, wherein component (a) is $\beta$ - (4 -hydroxy-3,5-di-tert.-butylphenyl)-propionic acid and component (b) is phosphorous acid.

References Cited
UNITED STATES PATENTS 3,285,855  11/1966  Dexter _____ 260—45.85 R
3,174,944  3/1965   Brondes _____ 260—45.85 R

FOREIGN PATENTS 945,186  12/1963  Great Britain ___ 260—45.95 C

OTHER REFERENCES
"Encyclopedia of Chemical Technology," 1968, pp. 92 and 93.

DONALD E. CZAJA, Primary Examiner

W. E. PARKER, Assistant Examiner

U.S. Cl. X.R.
360—45.7 P, 45.95 R, 75 L, 78 L